US007712254B2

(12) United States Patent
Klohr et al.

(10) Patent No.: US 7,712,254 B2
(45) Date of Patent: May 11, 2010

(54) COMPACTABLE GARDEN PLANTER

(76) Inventors: Kenneth R. Klohr, 1029 Clifton Ave., Redlands, CA (US) 92373; Bobbie L. Klohr, 1029 Clifton Ave., Redlands, CA (US) 92373

( * ) Notice: Subject to any disclaimer, the term of this patent is extended or adjusted under 35 U.S.C. 154(b) by 875 days.

(21) Appl. No.: 11/379,027

(22) Filed: Apr. 17, 2006

(65) Prior Publication Data

US 2006/0230675 A1 Oct. 19, 2006

Related U.S. Application Data

(60) Provisional application No. 60/672,218, filed on Apr. 18, 2005.

(51) Int. Cl.
*A01G 9/02* (2006.01)

(52) U.S. Cl. ............................ 47/66.3; 47/66.1; 47/33; 47/68

(58) Field of Classification Search ..................... 47/18, 47/33, 65.5, 65.7, 65.9, 66.1, 66.2, 66.3, 47/66.4, 66.6, 68, 73, 85, 39; 220/6, 7, 4.28, 220/4.29; 119/431, 461, 474, 491, 492, 498, 119/499, 513, 514
See application file for complete search history.

(56) References Cited

U.S. PATENT DOCUMENTS 4,603,658 A * 8/1986 Garnsey ..................... 119/499
4,796,383 A * 1/1989 Inoue et al. .................... 47/73
5,215,205 A * 6/1993 Behlman .................. 220/4.31
5,953,858 A * 9/1999 Loosen ....................... 47/66.1
6,405,888 B1 * 6/2002 Overholt et al. ................ 220/6

* cited by examiner

*Primary Examiner*—T. Nguyen
(74) *Attorney, Agent, or Firm*—Christina S. Loza; Loza & Loza, LLP

(57) ABSTRACT

At least one embodiment of the invention pertains to a collapsible planter apparatus is provided comprising (1) a floor section having one or more drainage holes, (2) a first side wall hingeably coupled to a first edge of the floor section, and (3) and a second side wall hingeably coupled to a second edge of the floor section opposite the first edge of the floor section. A third side wall may be removably coupled between the first and second side walls along a third edge of the floor section. A fourth side wall may also be removably coupled between the first and second side walls along a fourth edge of the floor section opposite the third edge of the floor section.

14 Claims, 4 Drawing Sheets

100
102A
114A
106
108
114B
116
102B
110
104
118
112

COMPACTABLE GARDEN PLANTER

CLAIM OF PRIORITY UNDER 35 U.S.C. §119

The present Application for Patent claims priority to Provisional Application No. 60/672,218 entitled "Ken's Portable Garden" filed Apr. 18, 2005, and hereby expressly incorporated by reference.

FIELD

Various embodiments of the invention pertain to garden planters. At least one embodiment of the invention pertains to a collapsible, compactable, and portable garden planter.

BACKGROUND

Gardening and landscaping serve an important part in the daily life of many Americans. Although large spaces are desirable for gardening and landscaping, all types of people garden and landscape on any available area around their home, town home, apartment or condominiums. In smaller spaces, it is often necessary to use sunny rooms, porches, and balconies and gardening in individual planters.

Individual planters allow the buyer to create their own gardens without a lot of space. The buyer can plant flowers, herbs, and vegetables and take care of their garden in their homes or on their balconies. This allows the consumer to garden without the typically larger spaces necessary to garden in.

Even though this allows gardeners with small spaces to plant flowers and other items, during the off season planters often become quite drab as the flowers and other plants die or wilt. Accordingly, the planter proceeds to occupy a great deal of space that could be used for storage or other purposes during the fall and winter seasons. This is especially true in a limited space situation like an apartment or condominium. Moreover, the lost space is not only unusable but aesthetically unattractive.

Additionally, full size planters also take up more shelve space at retail stores, warehouses, and carrier trucks. This additional space results in added costs to store and transport conventional planters.

Accordingly, a planter which solves the problems of lost space and lack of aesthetic appeal is desirable.

SUMMARY OF THE INVENTION

A collapsible planter apparatus is provided comprising (1) a floor section having one or more drainage holes, (2) a first side wall hingeably coupled to a first edge of the floor section, and (3) and a second side wall hingeably coupled to a second edge of the floor section opposite the first edge of the floor section. A third side wall may be removably coupled between the first and second side walls along a third edge of the floor section. A fourth side wall may also be removably coupled between the first and second side walls along a fourth edge of the floor section opposite the third edge of the floor section.

In a disassembled state, the first and second side walls are folded onto the floor section and the third and fourth side walls are decoupled from the first and second side walls and floor section and stacked on the first and second side walls and floor section to form a compact bundle. One or more removable dividers may be provided between the side walls of the collapsible planter apparatus to provide separate planting sections.

The first and second side walls may include grooves to receive abutting edges of the third and fourth side walls when the collapsible planter apparatus is assembled. The grooves may include interlocking channels configured to receive corresponding interlocking edges of the third and fourth side walls. The floor section may also include grooves along the third and fourth edges to receive abutting edges of the third and fourth side walls when the collapsible planter apparatus is assembled. In some implementations, the floor section may include a first section and a second section hingeably connected at an edge that permits the floor section to be folded in the unassembled state. In the assembled position, the first, second, third, and fourth side walls define an opening for the planter that is larger than the area of the floor section.

The first, second, third, and fourth side walls may have a textured exterior surface that creates a faux appearance. The floor and side walls may be made of plastic, Plexiglass®, metal, fiberglass, wood, or composite material.

Another embodiment provides a collapsible planter comprising a floor section having a curvy-linear shape, the floor section including one or more grooves around the perimeter of the floor section that are configured to accept an interlocking edge of a side wall; and one or more side walls that bend to conform to the shape of the perimeter of the floor section. The one or more side walls may include an edge that is removably coupled to the one or more grooves on the floor section. The curvy-linear floor section may include two sections that are foldably coupled to each other and may include drainage holes. The one or more side walls may include a receiving edge and a corresponding mating edge to secure the one or more side walls together along abutting edges. The curvy-linear floor section may have a circular, semi-circular, elliptical, or oval shape.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

Figure 1:
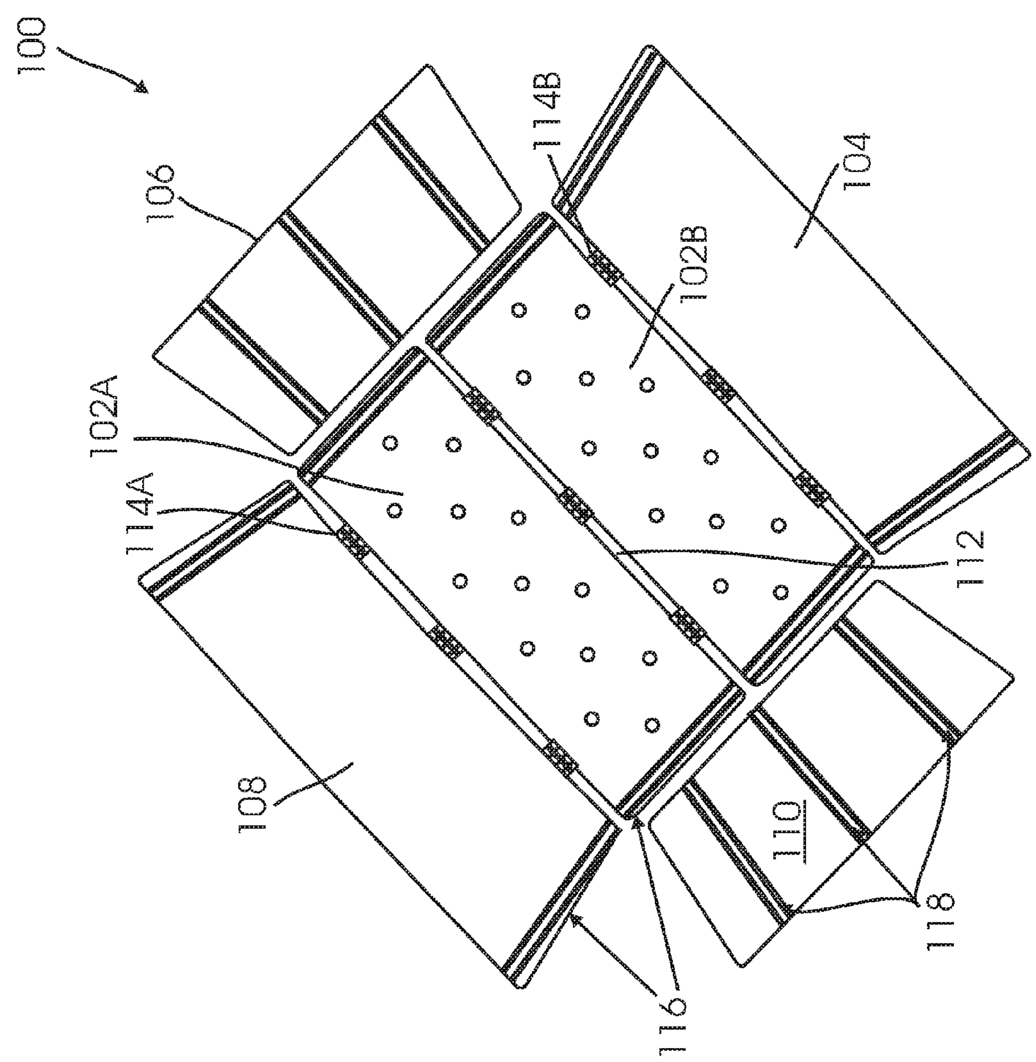
FIG. 1 illustrates the unassembled pieces of a planter 100 according to one embodiment of the invention.

FIG. 1 illustrates the unassembled pieces of a planter 100 according to one embodiment of the invention. The planter 100 includes a floor section 102 and a plurality of side wall sections 104, 106, 108, and 110. The floor section 102 and side walls 104, 106, 108, and 110 may be interconnected via hinged mechanisms 114A and 114B that facilitate quick assembly and/or disassembly of the planter 100. These hinged mechanisms may also include accommodating slots along the side walls 104, 106, 108, and 110 and/or floor section 102 to receive an adjacent piece and provide strength to the assembled planter 100.

In one embodiment, the side walls 104, 106, 108, and 110 may be pivotally coupled to the floor section(s) 102 when assembled and disassembled. This may be accomplished by having foldable edges or hinges between the side walls 104, 106, 108, and 110 and/or the floor section 102. From the disassembled position illustrated in FIG. 1, the side walls 104, 106, 108, and 110 can simply be folded upward and coupled to each other at adjacent corners to form an assembled planter (illustrated in FIG. 2).

In one embodiment of the invention, the side walls 104 and 108 may be attached by hinged mechanisms 114A and 114B to the floor 102 in a disassembled state, permitting the side walls 104 and 108 to be compactly folded on to the floor 102. The floor 102 may include two or more portions 102A and 102B that are also hinged and/or foldable to create a more compact bundle when the floor 102A and 102B and side walls 104 and 108 are folded on each other for storage or transport. Side walls 106 and 110 are removable for storage and folding purposes. The removable side walls 106 and 110 may be connected to the other side walls 104 and 108 and/or floor 102 via one/or more grooves 116 that accepts the abutting edges of the adjacent side walls 106 and/or 110. One or more of the grooves 116 may have an interlocking channel that receives a corresponding interlocking edge of the side walls 106 and/or 110 to prevent the side walls 106 and/or 110 from accidentally decoupling from the floor section 102 and/or other side walls 104 and/or 108.

Figure 2:
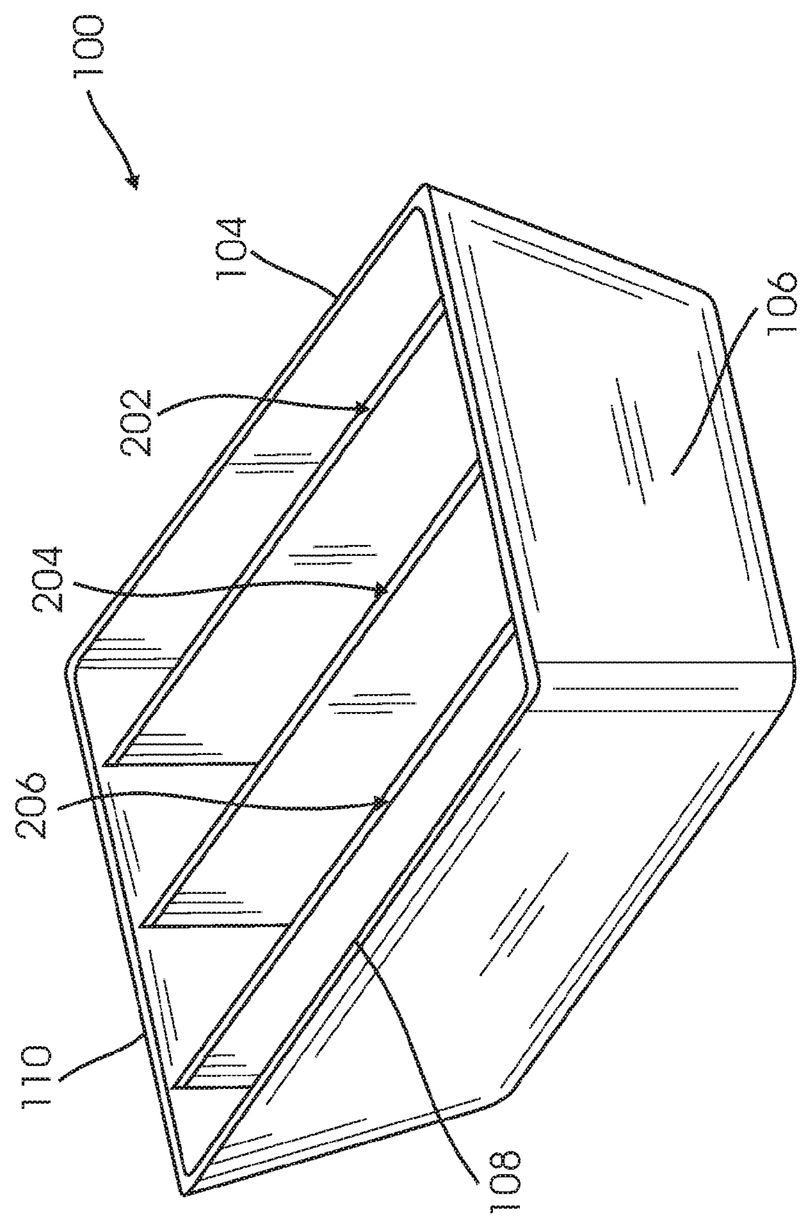
FIG. 2 illustrates an assembled planter 100 according to one embodiment of the invention.

In another implementation, the side walls 104, 106, 108, and 110 may be removably coupled to the floor section(s) 102 in the disassembled position. A plurality of interlocking grooves, tabs, compression-fit joints, and/or fasteners may be located near or along the edges of the side walls 104, 106, 108, and 110 and/or floor section(s) 102 and serve to couple the floor section(s) 102 and side walls together when assembled (as illustrated in FIG. 2). When disassembled, the side walls 104, 106, 108, and 110 and floor section(s) 102 can be aligned and bundled into a compact package that facilitates storage and/or transportation. Additionally, integrating the fastening mechanism (e.g., interlocking grooves, tabs, etc.) into the edges of one or more side walls 104, 106, 108, and 110 and/or floor section(s) 102 prevents these from being lost or misplaced when the planter 100 is disassembled.

One feature provides for one or more partitions and/or dividers that may be inserted in the planter 100. The partitions and/or dividers (illustrated in FIG. 2) may be inserted into guides or slots 118 in the side walls 106 and 110, 104 and 108 (not shown) and/or the floor section 102 (not shown) to provide individual planting sections.

In one implementation the planter 100, floor 102, and/or side walls 104, 106, 108, and 110 may be made of various durable materials such as plastic, Plexiglass®, fiberglass, wood, metal and/or composite material. The side walls may be of a clear material, textured, and or painted to provide an aesthetically pleasing finish (e.g., faux appearance) depending on the application.

One feature provides for the side walls and floor section to have approximately the same width so that when disassembled and stacked together they form a compact bundle. For this purpose, the floor section may be composed of two or more pieces 102A and 102B that fold or are interconnected to each other along an edge 112. This compactable planter 100 frees up much needed floor and storage space when not in use and eliminates the need for bulky planters.

The planter may be designed in various lengths, widths, and heights according to each desired implementation. In one embodiment the planter 100 has dimensions of approximately four and one half feet in length, three feet wide, and one and one half feet in depth when assembled.

In another embodiment of this invention the side walls 104, 106, 108, and 110 may be trapezoidal in shape such that when the planter is fully assembled the perimeter at the top of the planter is greater than that of the floor 102. In various embodiments of the invention, other planter shapes may be used including circles, semi-circle ovals, triangles, rectangles, and/or squares.

The floor section 102 may include a plurality of drainage holes allowing any water poured over the planter to drain out of the holes. If the planter 100 is for indoor use, a basin may be attached or place at the bottom of the planter to receive any leaking water not absorbed by the soil.

FIG. 2 illustrates an assembled planter 100 according to one embodiment of the invention. The planter 100 may be easily assembled by laying the floor section flat and attaching the side walls thereto and/or folding the hinged side walls up so that they stand upright in relation to the floor section creating a unit that is a base enclosed by four erected side walls.

One feature provides for one or more partitions and/or dividers 202, 204, and 206 that are inserted in the planter 100. The partitions and/or dividers 202, 204, and 206 may be inserted into guides or slots in the side walls 110, 106, 104, and 108 and/or the floor section 102 to provide individual planting sections. The planter 100 may then be filled with an adequate amount of soil to grow the desired plants. Each section may hold a different flower, herb, vegetable, or spice for variety or may hold the same material. If desired, the consumer may use as many or as few partitions and/or dividers 202, 204, 206 according to the consumer's preference.

To disassemble the planter 100, the soil is first removed. The planter 100 may then be rinsed to remove any soil or particles from the unit prior to storage. The side walls 110, 106, 104, and 108 and partitions 202, 204, and 206 can then be removed by unlocking the hinges. Once the hinges are unlocked, the user could fold them down onto the floor section 102 such that the entire planter could be compacted into a flat rectangle. At that point, the user could easily store the planter, during the off season, in a smaller space such as a closet or even under a bed.

Figure 3:
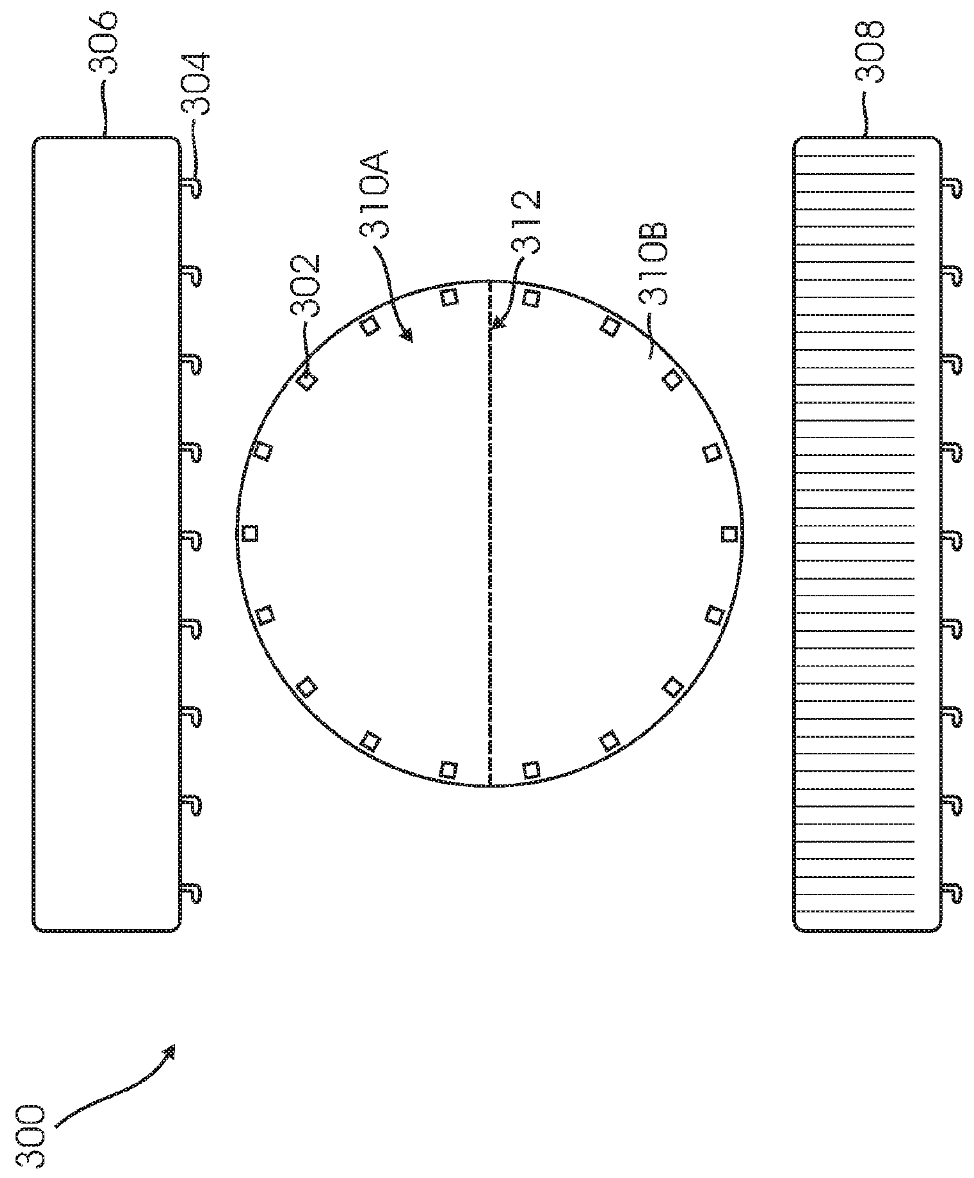
FIG. 3 illustrates a circular collapsible and compactable planter according to another embodiment of the invention.
Figure 4:
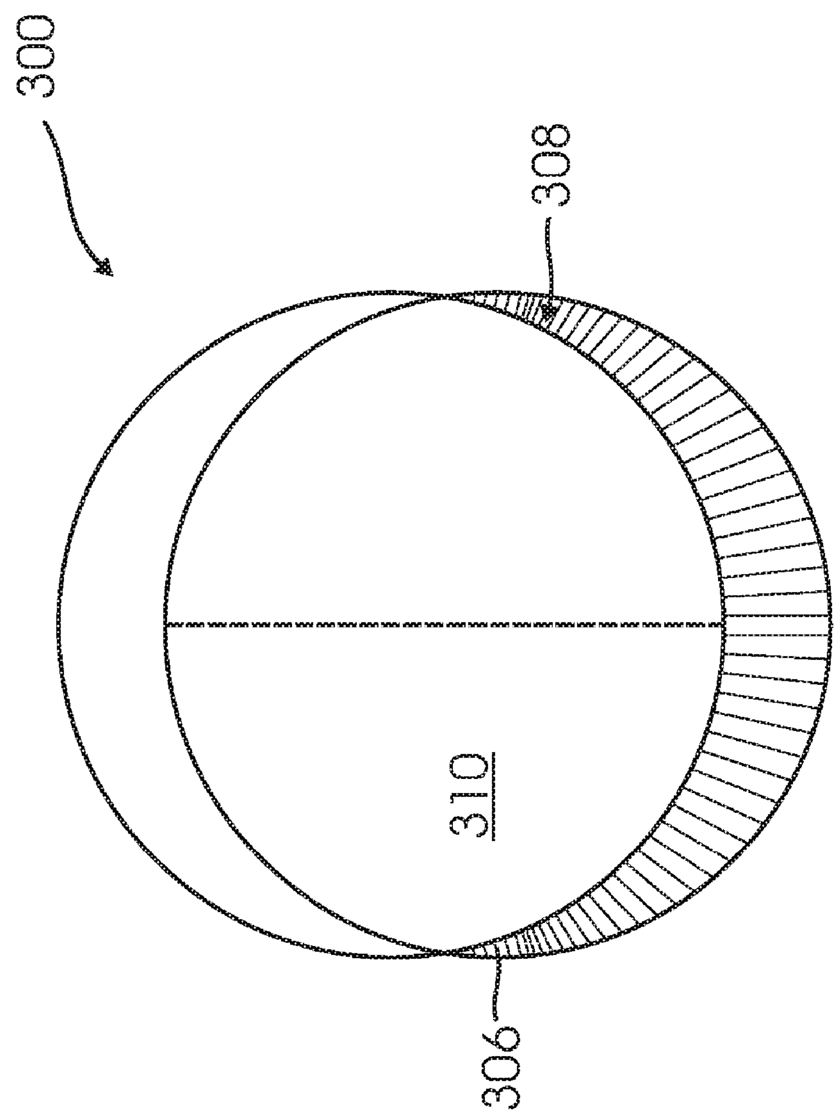
FIG. 4 illustrates a circular collapsible and compactable planter according to another embodiment of the invention

FIGS. 3 and 4 illustrate a circular collapsible and compactable planter according to another embodiment of the invention. FIG. 3 illustrates an unassembled circular collapsible and compactable planter 300 with a plurality of grooves 302 situated around the perimeter of a floor section 310 such that each groove 302 can accept or interlock with a corresponding hook 304 on a wall 306 and 308. In various embodiments of the invention, the planter 300 may have a curvylinear shape such as a circular, semi-circular, oval and/or elliptical shape for aesthetic or other purposes. When assembled, the side walls 306 and 308 may bend to conform to the shape of the perimeter of the floor section 310. The side walls 306 and 308 may include a receiving edge and a corresponding mating edge to secure the one or more side walls together along abutting edges. In other embodiments, a single side wall that bends to wrap around the perimeter of the floor section 310 may be used to form the planter wall. When disassembled, the side walls 306 and 308 may substantially flat so that they can be stacked on the floor section 310 and form a compact bundle for storage.

One feature provides for the floor section 310 comprised of two pieces 310A and 310B so that the planter 300 may collapse along an edge 312. The floor section 310 may include a plurality of drainage holes to allow water to flow out of the planter 300. When collapsed, the planter 300 can be easily stored away when not it use.

One or more of the components and functions illustrated in FIGS. 1, 2, 3 and/or 4 may be rearranged and/or combined into a single component or embodied in several components without departing from the invention. Additional elements or components may also be added without departing from the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A collapsible planter apparatus comprising:

a floor section having a bottom perimeter and one or more drainage holes, and where the floor section includes a first portion hingedly coupled to a second portion;

a first side wall hingeably coupled to a first edge of the floor section;

a second side wall hingeably coupled to a second edge of the floor section opposite the first edge of the floor section;

a third side wall removably coupled between the first and second side walls along a third edge of the floor section;

a fourth side wall removably coupled between the first and second side walls along a fourth edge of the floor section opposite the third edge of the floor section;

wherein when the planter is fully assembled, top edges of the first, second, third and fourth side walls form a top perimeter and wherein the top perimeter is greater than the bottom perimeter of the floor section;

wherein the width of the side walls are the same as the width of the first portion of the floor section and the second portion of the floor section allowing for the first side wall to be folded directly on top of the first portion of the floor section and the second side wall to be folded directly on top of the second portion of the floor section;

wherein a disassembled state the first and second side walls are folded onto the floor section and the third and fourth side walls are decoupled from the first and second side walls and floor section and stacked on the first and second side walls and floor section to form a compact bundle.

2. The apparatus of claim 1 further comprising:

one or more removable dividers that fit between the side walls of the collapsible planter apparatus to provide separate planting sections.

3. The apparatus of claim 1 wherein the first and second side walls include grooves to receive abutting edges of the third and fourth side walls when the collapsible planter apparatus is assembled.

4. The apparatus of claim 3 wherein the grooves include interlocking channels configured to receive corresponding interlocking edges of the third and fourth side walls.

5. The apparatus of claim 1 wherein the floor section includes grooves along the third and fourth edges to receive abutting edges of the third and fourth side walls when the collapsible planter apparatus is assembled.

6. The apparatus of claim 1, wherein the floor section includes a first section and a second section hingeably connected at an edge that permits the floor section to be folded in the unassembled state.

7. The apparatus of claim 1 wherein the assembled position the first, second, third, and fourth side walls define an opening for the planter that is larger than the area of the floor section.

8. The apparatus of claim 1 wherein the first, second, third, and fourth side walls have a textured exterior surface that creates a faux appearance.

9. The apparatus of claim 1 wherein the floor and side walls is made of one of either a plastic, Plexiglass®, metal, fiberglass, wood, or composite material.

10. A compactable planter comprising:

a floor section, the floor section having a bottom perimeter and where the floor section includes a first portion hingedly coupled to a second portion;

means for hingeably coupling a first side wall to a first edge of the floor section;

means for hingeably coupling a second side wall to a second edge of the floor section opposite the first edge of the floor section;

means for removably coupling a third side wall removably coupled between the first and second side walls along a third edge of the floor section; and means for removably coupling a fourth side wall removably coupled between the first and second side walls along a fourth edge of the floor section opposite the third edge of the floor section; and wherein when the planter is fully assembled, top edges of the first, second, third and fourth side walls form a top perimeter and wherein the top perimeter is greater than the bottom perimeter;

wherein the width of the side walls are the same as the width of the first portion of the floor section and the second portion of the floor section allowing for the first side wall to be folded directly on top of the first portion of the floor section and the second side wall to be folded directly on top of the second portion of the floor section.

11. The compactable planter of claim 10 further comprising:

means for accepting a plurality of partitions to divide the assembled planter into a plurality of sections.

12. The compactable planter of claim 10 wherein a disassembled state the first and second side walls are folded onto the floor section and the third and fourth side walls are decoupled from the first and second side walls and floor section and stacked on the first and second side walls and floor section to form a compact bundle.

13. The compactable planter of claim 10 wherein the floor section has a plurality of drain holes.

14. The compactable planter of claim 10 wherein the floor section includes a first section and a second section hingeably connected at an edge that permits the floor section to be folded in the unassembled state.

* * * * *